(12) United States Patent
Hayashi et al.

(10) Patent No.: US 7,732,082 B2
(45) Date of Patent: Jun. 8, 2010

(54) FUEL CELL MODULE

(75) Inventors: Tomokazu Hayashi, Toyota (JP); Iwao Myojin, Kitakyushu (JP); Tsutomu Ochi, Toyota (JP); Chisato Kato, Aichi-gun (JP); Koichiro Kawakami, Toyota (JP); Hiroo Yoshikawa, Susono (JP); Manabu Takahashi, Toyota (JP); Yasuyuki Asai, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 276 days.

(21) Appl. No.: 11/578,262

(22) PCT Filed: Apr. 26, 2005

(86) PCT No.: PCT/JP2005/008404

§ 371 (c)(1),
(2), (4) Date: Oct. 13, 2006

(87) PCT Pub. No.: WO2005/104287

PCT Pub. Date: Nov. 3, 2005

(65) Prior Publication Data

US 2008/0026281 A1 Jan. 31, 2008

(30) Foreign Application Priority Data

Apr. 26, 2004 (JP) .............................. 2004-130021

(51) Int. Cl.
*H01M 2/08* (2006.01)
(52) U.S. Cl. ........................................................ 429/36
(58) Field of Classification Search .................... 429/36
See application file for complete search history.

(56) References Cited

U.S. PATENT DOCUMENTS

| 6,610,435 | B1 | 8/2003 | Maruyama et al. |
| 6,699,613 | B2 | 3/2004 | Inoue et al. |
| 6,733,916 | B2 * | 5/2004 | Mizuno ....................... 429/36 |
| 2002/0187384 | A1 | 12/2002 | Kato et al. |
| 2004/0028983 | A1 | 2/2004 | Hayashi et al. |

FOREIGN PATENT DOCUMENTS

| EP | 1 271 678 A2 | 1/2003 |
| JP | U 56-70255 | 11/1979 |
| JP | A-62-221435 | 9/1987 |
| JP | A 62-221435 | 9/1987 |

(Continued)

*Primary Examiner*—Patrick Ryan
*Assistant Examiner*—Thomas H. Parsons
(74) *Attorney, Agent, or Firm*—Oliff & Berridge, PLC (57) ABSTRACT

A fuel cell module, wherein slopes of a same angle θ relative to a bottom face are formed on both side faces to form a recessed groove in a tapered shape. Since the angle θ is provided to the side faces of the recessed groove, the exhaustion of gases from the accumulation of gasses to the outside can be assisted by the side faces with the angle θ more than in a case where the side faces of the recessed groove are formed in right angled shapes even if the accumulation of gases is produced between an adhesive agent and the inner surfaces of the recessed groove when first and second separators are joined to each other for modularization by covering the first separator on the second separator. Thus, the accumulation of the gases can be prevented from occurring.

14 Claims, 12 Drawing Sheets

FOREIGN PATENT DOCUMENTS

| | | |
|---|---|---|
| JP | A 2000-48832 | 2/2000 |
| JP | A 2000-48835 | 2/2000 |
| JP | A 2001-283893 | 10/2001 |
| JP | A 2001-319666 | 11/2001 |
| JP | A-2001-319676 | 11/2001 |
| JP | A 2001-319676 | 11/2001 |
| JP | A 2002-260691 | 9/2002 |
| JP | A 2002-367631 | 12/2002 |
| WO | WO 2005/008194 * | 1/2005 |

* cited by examiner

Prior Art

FUEL CELL MODULE

TECHNICAL FIELD

The present invention relates to a fuel cell module formed by stacking a plurality of fuel cells in layers.

BACKGROUND ART

In a fuel cell, a unit cell is composed of a fuel cell including a membrane electrode assembly (MEA) having an electrolyte layer of a solid polymer membrane or the like, diffusion layers of carbon cloth, carbon paper, or the like sandwiching the electrolyte layer, and separators sandwiching the membrane electrode assembly. In such a unit fuel cell, hydrogen gas, serving as an anode gas, is supplied to a hydrogen gas passage groove of a separator on a negative electrode side while air (oxygen gas), serving as a cathode gas, is supplied to an oxygen gas passage groove of a separator on a positive electrode side. The supplied hydrogen gas and oxygen gas diffuse into the respective diffusion layers on the negative electrode side and positive electrode side. The hydrogen gas reaching the diffusion layer of the negative electrode further contacts a catalyst layer applied on a solid polymer electrolyte membrane, and dissociates into protons and electrons. The dissociated protons permeate through the solid polymer membrane, and move toward the positive electrode to react with oxygen at the positive electrode to thereby produce water and electricity. Generally, a plurality of unit cells described above having such a power generation mechanism are used, and stacked with separators interposed therebetween to form a fuel cell as a whole as serially connected cell modules or cell stacks.

Figure 12:
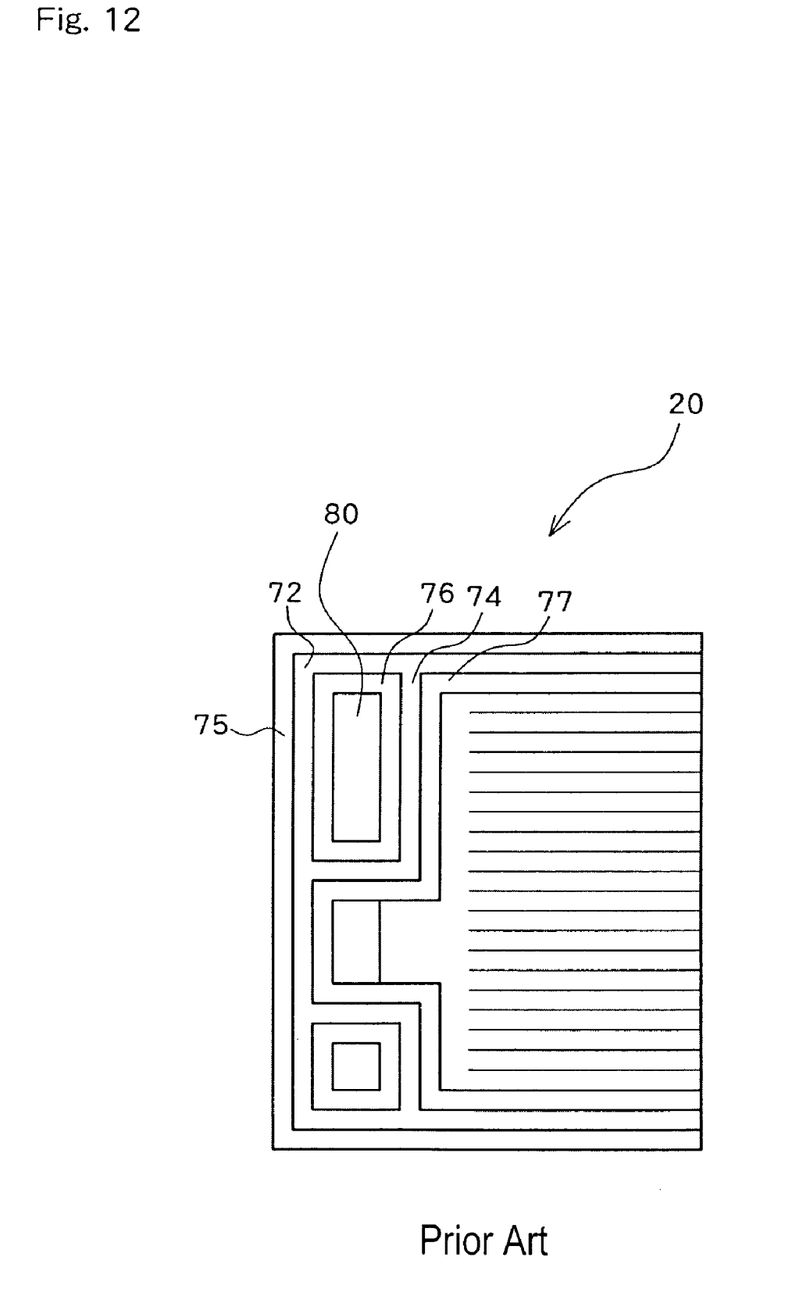
FIG. 12 is a plan view showing a fuel cell separator according to the related art.
Figure 13:
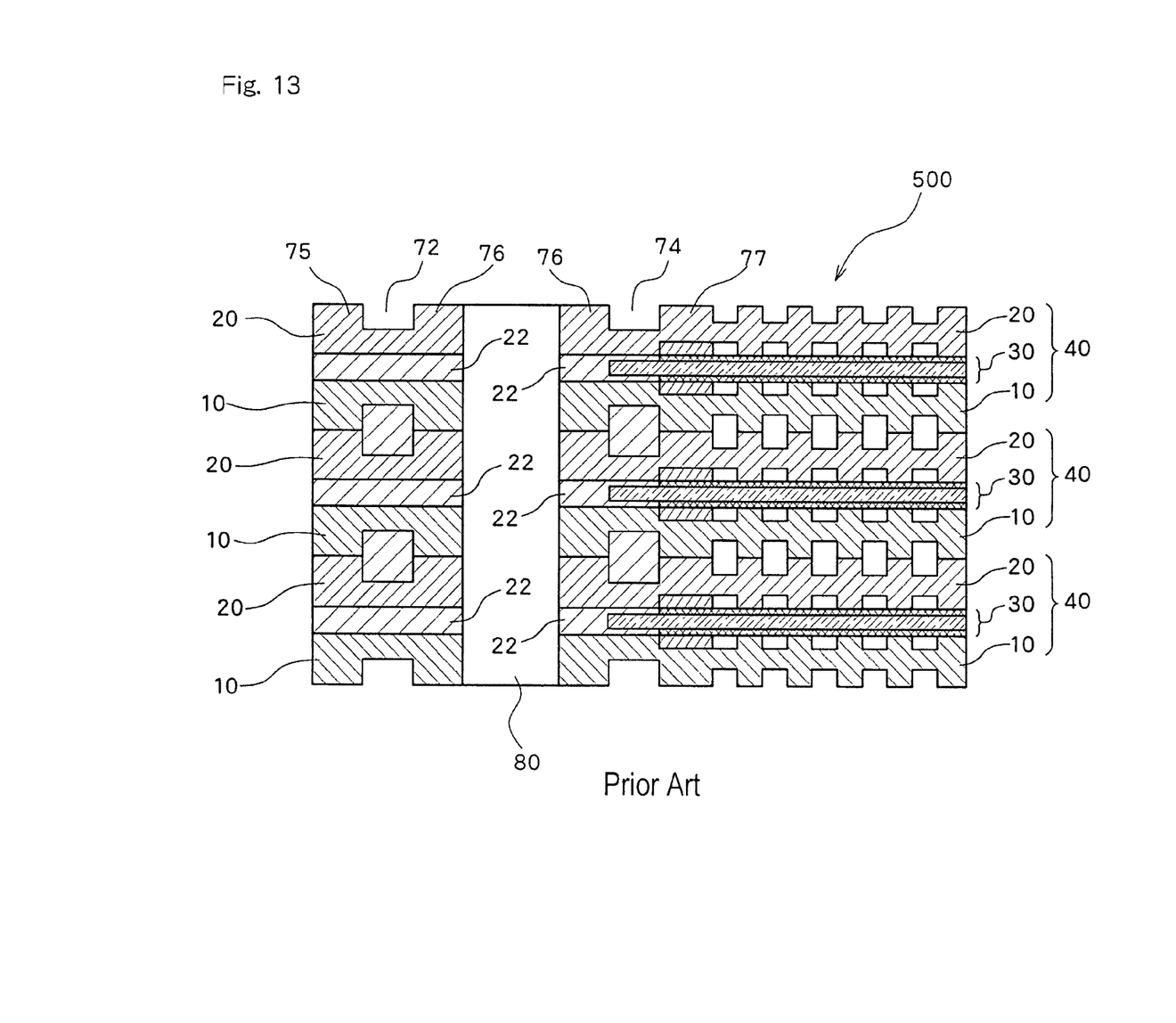
FIG. 13 is a cross sectional view showing a fuel cell module according to the related art.

FIG. 13 is a cross sectional view showing a fuel cell 500 of the related art. FIG. 12 is a plan view showing a separator 20 stacked in the fuel cell 500 shown in FIG. 13. The fuel cell 500 has a unit fuel cell 40 including an MEA 30, and a first separator 10 and a second separator 20 sandwiching the MEA 30. Note that the first separator 10 and the second separator 20 are bonded with an adhesive 22, and that the MEA 30 is sandwiched therebetween. The adhesive 22 also functions as a sealing agent for sealing a fluid (gas, coolant) supplied to an FC cell. The thus formed unit fuel cells 40 are further joined with the adhesive 22, so that the unit fuel cells 40 are affixed to each other in a physically solid manner to form a cell module. The cell module has a manifold 80 therein for passage of a gas or a refrigerant.

The separator 20 is provided with a separator outer peripheral weir 75 on the outermost peripheral surface thereof, and at a section interior thereto a manifold outer peripheral weir 76 is provided on an outer peripheral surface of the manifold 80 surrounding the same. At a further inner section, the separator includes a separator inner weir 77.

The separator 20 has a recessed groove functioning as an adhesive-holding section 24 for holding the adhesive. Referring to FIG. 13, the recessed groove includes an outer peripheral recessed groove 72 formed between side surface walls; i.e. the separator outer peripheral weir 75 and the manifold outer peripheral weir 76 on the outer peripheral side of the separator, and an inner peripheral recessed groove 74 formed between side surface walls; i.e. the manifold inner peripheral weir 76 on the inner peripheral side of the separator and the separator inner peripheral weir 77.

Figure 14:
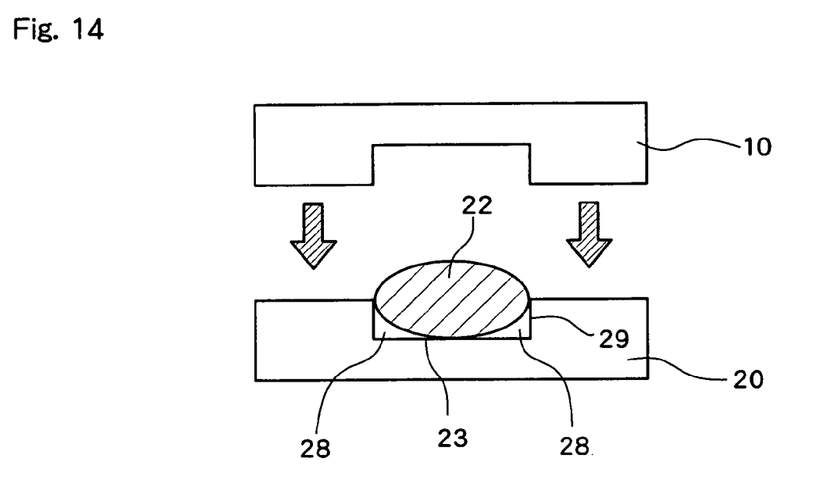
FIG. 14 is a view for describing a problem caused by a gas bubble.

The method of bonding the fuel cells 40 will be described with reference to FIG. 14. In the first and second separators 10 and 20, on opposing surfaces of the fuel cells in a direction where the layers are joined and stacked, a recessed groove 24 is provided with a side surface 29 positioned at right angles to a bottom surface 23. The adhesive 22 is applied in the right-angled recessed groove 24 of the second separator 20. After application of the adhesive 22, the first and second separators 10 and 20 are positioned so that the recessed grooves 24 of the first and second separators 10 and 20 face each other, thereby forming the adhesive-holding section 24 with its side surface 29 positioned perpendicular to the bottom surface 23. With the adhesive-holding section 24 thus formed holding the adhesive 22, the first and second separators 10 and 20 are bonded, thereby forming a module of the fuel cells 40.

The following references are known as disclosing the bonded separators. Patent document 1 (Japanese Patent Laid-Open Publication No. 2002-260691) described below discloses a separator for fuel cells in which a recessed pit having the side surface 29 disposed at right angles to the bottom surface 23 is provided around the manifold and a cooling water passage groove between the first and second separators, and a gas-impermeable adhesive is injected into the pit to bond the two plates, thereby suppressing gas permeation. Patent document 2 (Japanese Patent Laid-Open Publication No. 2002-367631) discloses a sealing structure having a pit for a material bubble between the bonded plates. Below-described patent document 3 (Japanese Patent Laid-Open Publication No. 2000-48832) discloses a fuel cell separator having a weir for preventing protrusion of the adhesive. Patent document 4 (Japanese Patent Laid-Open Publication No. 2001-319666) and patent document 5 (Japanese Patent Laid-Open Publication No. 2001-319676) described below disclose a separator sealed by a liquid seal applied in a groove provided surrounding a communicating hole.

However, the conventional recessed pit having the side surface 29 positioned at right angles to the bottom surface 23 may allow a gas, such as air, into an interface between the surface of the pit and the adhesive (sealing material) when the separators are assembled and bonded, whereby the adhesive may fail to completely fill in the recessed pit and thereby create a gap. Such a gap may lead to insufficient adhesion between the separators.

The reason why a gas is introduced during the step of bonding the separators will next be discussed. The adhesive 22 is applied to the recessed pit having the side surface 29 positioned at right angles to the bottom surface 23 in the second separator 20. Such an application of the adhesive 22 may allow a gas in between the surface of the recessed pit and the adhesive 22, and the gas introduction results in a gas bubble 28.

Figure 15:
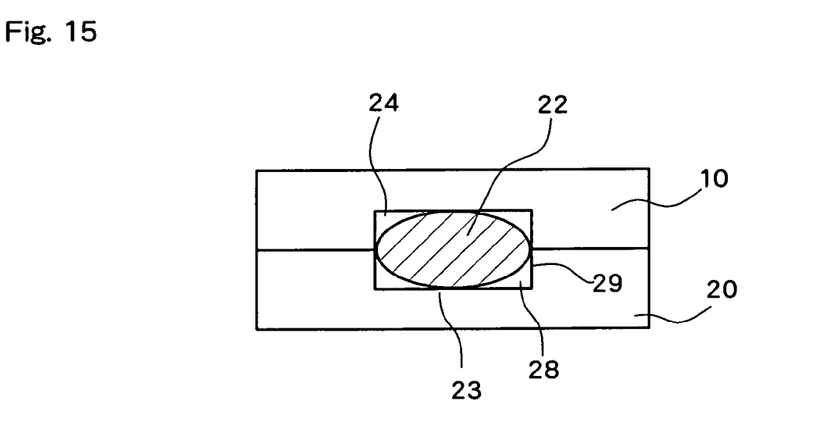
FIG. 15 is a view for describing a problem caused by a gas bubble.

When in such a state the first separator 10 is provided on the second separator 20 to bond the two and form a module (FIG. 14), the first and second separators 10 and 20 are bonded with the gas bubble 28 remaining in the recess (FIG. 15). By thus bonding the separators while the gas bubble remains may lead to the following problems caused by the gas bubble 28.

Figure 16:
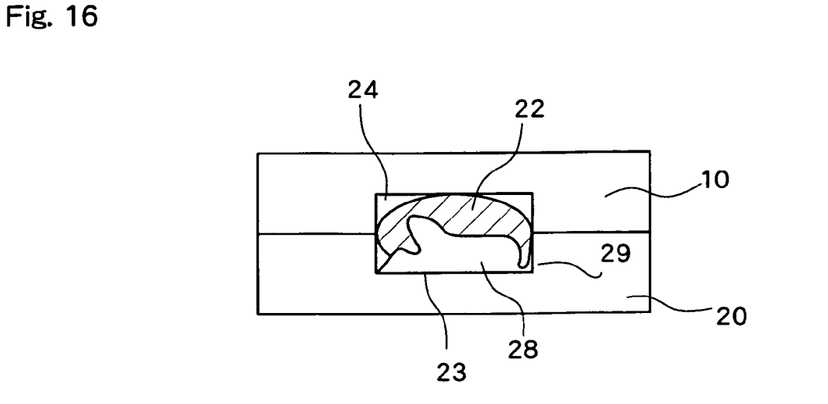
FIG. 16 is a view for describing a problem caused by a gas bubble.

(1) When a thermosetting adhesive is used for the adhesive 22, a step of thermally curing the adhesive is required. In such a thermosetting step, heat is transmitted not only to the adhesive but also to the gas bubble 28, which expands due to heat (FIG. 16). The expanded gas bubble 28 deteriorates adhesiveness of the adhesive 22, and may also partially break the adhesive and lead to gas leakage. In such a state, adhesion between the separators deteriorates, and the gas leaks through the adhesive (sealing agent) with lowered function.

(2) Fuel cells, including a solid polymer fuel cell operable at a relatively low temperature, are usually operated at a temperature of 70° C. to 80° C. At such a temperature higher than ordinary temperature, the gas bubble is also thermally expanded (FIG. 16). Such expansion of the gas bubble 28 may cause problems similar to those discussed in item (1).

The first separator 10 and the second separator 20 forming a unit fuel cell are affixed together with the adhesive 22, and the MEA 30 is sandwiched therebetween. The first and second separators have various stepped sections at the adhesion section. More specifically, the MEA 30 has a triple layered structure with the diffusion layer formed on either side of the electrolyte layer, and only the electrolyte layer extends outward, where it is sandwiched and fixed by the first and second separators 10 and 20. At least one of the first and second separators 10 and 20 forms a recessed section corresponding to the section sandwiching the electrolyte layer (see patent document 2).

A gas bubble is formed also at an end of the recessed section; i.e. a corner of the bottom surface and the side surface of the stepped section. Further, a hydrogen gas (fuel gas) or an oxidized gas (air) is supplied to a space between the MEA 30 and the first separator 10 or the second separator 20. Therefore, a channel for such a gas and the space must be brought into communication, and a sealing plate is used to prevent the adhesive from penetrating the communicating channel. A stepped section is formed in one of the first and second separators 10 and 20 corresponding to the end of the sealing plate, and a gas bubble is formed also at the corner of the bottom surface and the side surface of this stepped section.

When the gas in the gas bubble is heated and expanded during the bonding step, a leakage path between an internal space of the cell and the manifold functioning as the passage for the refrigerant may be formed.

DISCLOSURE OF INVENTION

The present invention aims to provide a fuel cell module for overcoming problems caused by a gas bubble.

The present invention provides a fuel cell module formed by stacking a plurality of fuel cells, comprising a separator component separating the plurality of fuel cells, an adjacent component disposed adjacent to the separator component in a direction in which the fuel cells are stacked, and affixed to the separator with an adhesive, and a recessed pit for holding the adhesive provided in at least one of the separator component and the adjacent component in a section where the separator component and the adjacent component are bonded to each other, wherein the recessed pit includes, in at least part of a peripheral edge thereof, a gas exhaustion assisting structure for assisting discharge of a gas present between the adhesive and a surface of the adhesive holding section to the outside when the separator component and the adjacent component are bonded to each other.

In the above fuel cell module, a side surface of the recessed pit is preferably formed as a slope.

In the above fuel cell module, the recessed pit is preferably tapered.

In the above fuel cell module, the slope is preferably provided at an angle of 120°-150° relative to a bottom surface on a side where the adhesive is held.

The above fuel cell module preferably further comprises a gas exhaustion groove disposed on the side surface of the recessed pit for discharging the gas to the outside.

In the above fuel cell module, the adhesive preferably contains an adhesive leakage suppression component for suppressing leakage of the adhesive to the outside.

In the above fuel cell module, preferably, the adhesive leakage suppression component is a spherical bead, and a diameter of the bead is larger than a passage diameter of the gas exhaustion groove.

The present invention provides a fuel cell module formed by stacking a plurality of fuel cells, comprising a separator component separating the plurality of fuel cells, an adjacent component disposed adjacent to the separator component in a direction in which the fuel cells are stacked, and affixed to the separator with an adhesive, and a stepped section for holding the adhesive provided in at least one of the separator component and the adjacent component in a section where the separator component and the adjacent component are bonded to each other, wherein a gas exhaustion assisting structure for assisting discharge of a gas present between the adhesive and a surface of the stepped section to the outside when the separator component and the adjacent component are bonded to each other is provided at the stepped section.

The above gas exhaustion assisting structure preferably includes a slope provided at a junction section between a bottom surface and a side surface of the stepped section for connecting the bottom surface and the side surface. Such a configuration can eliminate a corner which would otherwise be formed by the bottom surface and the side surface contacting each other directly.

Preferably, the stepped section is a recessed pit, and a slope is provided at a junction section between a bottom surface and a side surface of the recessed pit.

In the above fuel cell module, the adjacent component disposed adjacent to the separator component in the direction in which the cells are stacked is preferably a metal separator.

The present invention contributes to a greater suppression of problems caused by a gas bubble.

BEST MODE FOR CARRYING OUT THE INVENTION

Embodiments of the present invention will now be described with reference to the drawings. Note that the embodiments are merely examples for implementing the present invention, and do not limit the invention.

[Fuel Cell]

Figure 1:
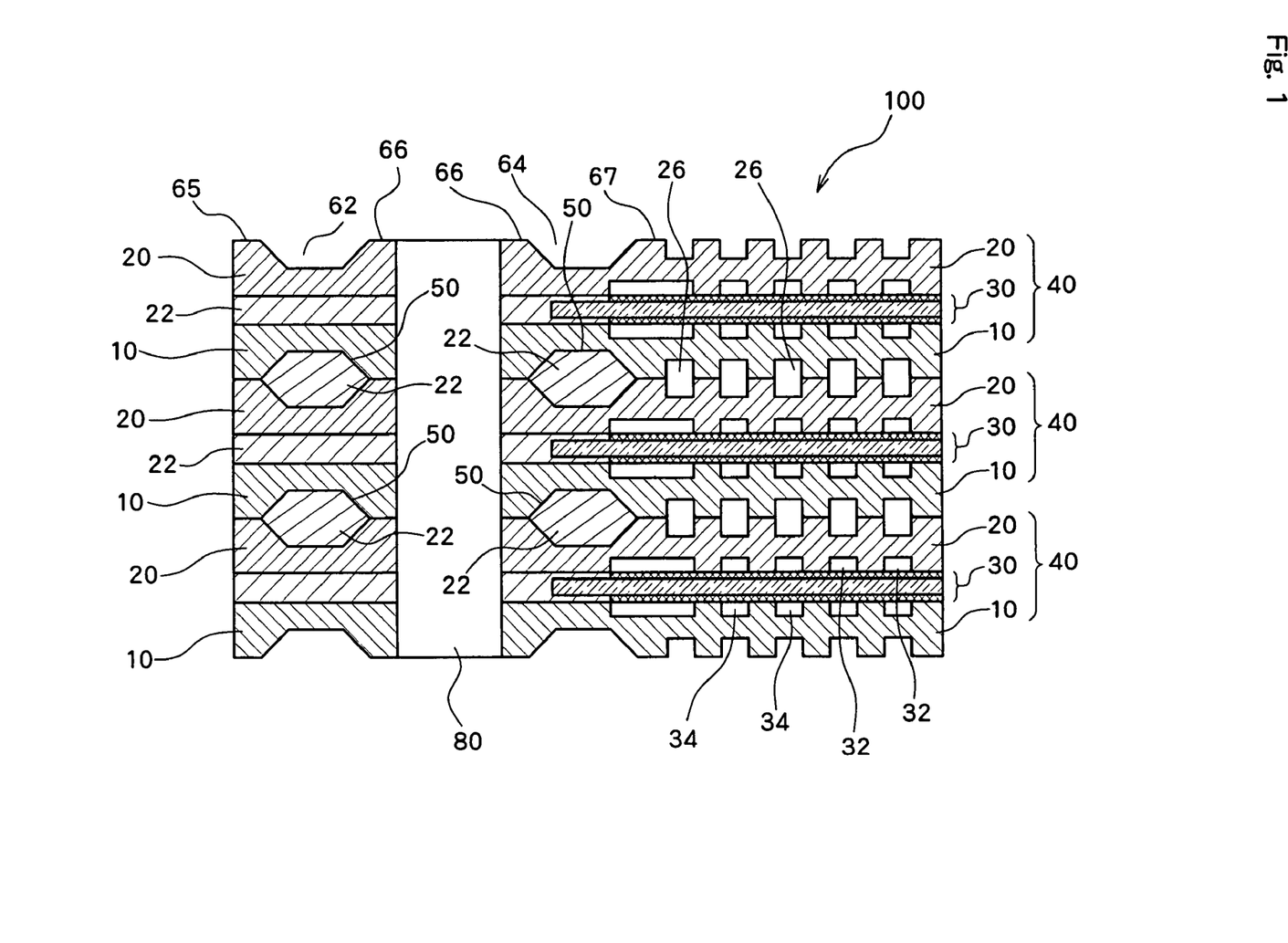
FIG. 1 is a cross sectional view showing a fuel cell module according to an embodiment of the present invention.
Figure 2:
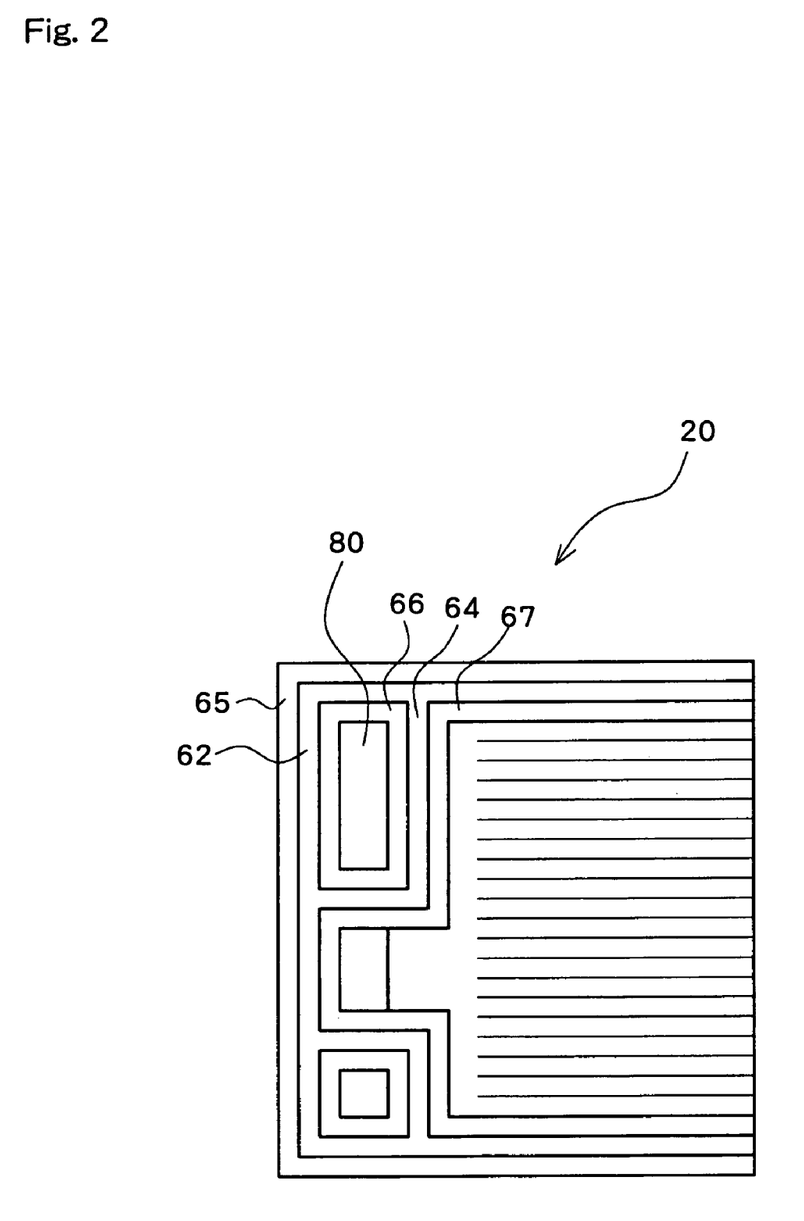
FIG. 2 is a plan view showing a fuel cell separator according to the embodiment of the present invention.

FIG. 1 discloses a cross sectional view of a fuel cell 100 according to an embodiment of the present invention. FIG. 2 is a plan view of a single separator 20 stacked to form the fuel cell 100. The fuel cell 100 has a fuel cell 40 structure in which an MEA 30 is sandwiched by a first separator 10 and a second separator 20. The structure includes multiple stacked layers of such fuel cells 40. The fuel cell 40 is formed by the first separator 10 and the adjacent second separator 20 bonded together with an adhesive. The fuel cells 40 are further bonded with an adhesive 22, thereby forming a stacked structure (cell module). The fuel cells 40 are bonded in a physically strong manner with such an adhesive, thereby forming a cell module. The cell module (stack) has a manifold 80 for passage of a gas or a refrigerant.

The separator 20 is provided with a separator outer peripheral weir 65 at an outermost peripheral surface thereof, and at a section interior thereto a manifold outer peripheral weir 66 surrounding the manifold 80 at an outer peripheral surface thereof. At a section further interior thereto, a separator inner peripheral weir 67 is provided.

The separator 20 has a recessed groove functioning as an adhesive-holding section 24 for holding an adhesive. As shown in FIG. 1, the recessed groove is formed by an outer peripheral recessed groove 62 formed between the separator outer peripheral weir 65 and the manifold outer peripheral weir 66 on the outer peripheral side of the separator with the weirs 65 and 66 functioning as side surface walls, and an inner peripheral recessed groove 64 formed between the manifold inner peripheral weir 66 on the inner side of the separator and the separator inner peripheral weir 67 with the weirs 66 and 67 functioning as side surface walls.

The first separator 10 and the second separator 20 are provided with a recessed groove having a concave cross section at a surface where the fuel cells face each other in a direction of forming a cell module. The recessed groove is characterized in that a side surface (the direction of stacking layers) is formed as a slope with respect to a bottom surface (the direction of the surface). In the second separator 20 having the recessed groove, the adhesive 22 is applied to the inner surface of the recessed groove. After application of the adhesive 22, the first separator 10 and the second separator 20 are positioned so that the two recessed grooves of the first and second separators 10 and 20 face each other, thereby forming an adhesive-holding space 50. The thus-formed adhesive-holding space 50 holds the adhesive 22, and the first and second separators 10 and 20 are bonded with the adhesive 22, thereby assembling the fuel cells, and forming a module.

While the second separator is used as an adjacent component in the present embodiment, at least one of a separator, an electrolyte membrane, a membrane-electrode assembly, and a resin frame is used as the adjacent component.

Figure 3:
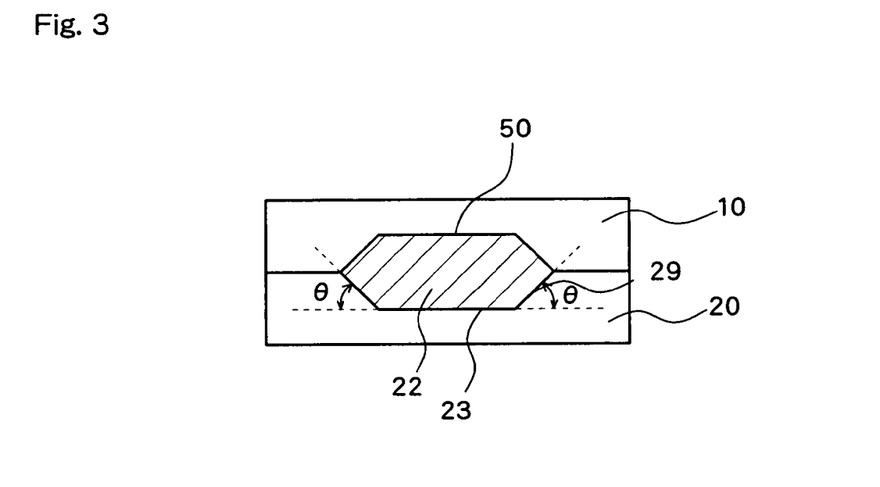
FIG. 3 shows a gas exhaustion assisting structure according to the embodiment of the present invention.

The side surface 29 of the recessed groove is formed as a slope of an angle $\theta$ with respect to the bottom surface 23. Referring to FIG. 3, a slope is formed on either side surface at the same angle $\theta$ with respect to the bottom surface 23. The angle $\theta$ is an angle smaller than 90 degrees; i.e. the side surface of the recessed groove is not at right angles. By thus providing the side surface 29 of the recessed groove with the angle $\theta$, generation of a gas bubble between the adhesive 22 and the inner surface of the recessed groove can be prevented when a module is formed by placing the first separator 10 on the second separator 20 and bonding the two. More specifically, upon formation of a module, the side surface 29 with the angle $\theta$ assists exhaust of gas to the outside to a greater extent than does a right-angled side surface of the recessed groove. As a result, generation of a gas bubble can be suppressed. It is also possible to suppress deterioration in adhesive force of the adhesive or breakage of the adhesive, which may otherwise be caused by thermal expansion of the gas bubble after a module is formed.

The first separator 10 and the second separator 20 may be formed of carbon, metal, resin, conductive resin, or the like. By way of example, the first and second separators 10 and 20 may both be metal separators or carbon separators (molded part formed of carbon and resin binding the carbon). In the example of FIG. 1, both the first and second separators 10 and 20 are carbon separators.

The first separator 10 is provided with a fuel gas channel 34 for supplying a fuel gas to the MEA 30 while the second separator 20 is provided with an oxidized gas channel 32 for supplying an oxidized gas to the MEA 30. The first and second separators 10 and 20 are also provided with a refrigerant channel 26 for passage of a refrigerant (cooling water is usually used) at a joining surface opposite the surface where the gas channels 32, 34 are formed. The channels 26, 32, 34 may be serpentine channels folded back at one or more sections to extend from an inlet to an outlet, or straight channels extending in a straight manner from the inlet to the outlet.

The first and second separators 10 and 20 are provided with manifolds 80 including a refrigerant manifold, a fuel gas manifold, and an oxidized gas manifold, extending in the direction in which the cells are stacked. The refrigerant manifold communicates with the refrigerant channel 26, and the fuel gas manifold communicates with the fuel gas channel 32. The oxidized gas manifold communicates with the oxidized gas channel 34. These manifolds are formed at a facing end of the first and second separators 10 and 20, and the channels 26, 32, and 34 in the cell surface are formed in a central region of the separators excluding a manifold formation region. The region where the gas channel region is located and the MEA 30 is provided is a power generation region of the cell.

The MEA 30 and the first and second separators 10 and 20 are stacked to form a fuel cell 40, and a cell module is formed of at least one fuel cell 40. The modules are stacked to form a cell stacked assembly, and a terminal, an insulator, and an end plate are positioned at either end of the cell stacked assembly in the direction in which the cells are stacked, and the cell stacked assembly is fastened in the cell stacking direction, and fixed on the outer side of the cell stacked assembly with a tension plate extending in the cell stacking direction, a bolt, and a nut, thereby constructing a fuel cell stack.

[Gas Exhaustion Assisting Structure]

Although in a gas exhaustion assisting structure of the adhesive-holding section having the recessed groove, either side surface 29 is formed as a slope at the same angle θ with respect to the bottom surface 23 so that the recessed groove is tapered according to the present embodiment, various other forms can be employed, so long as the structure can suppress generation of a gas bubble more effectively than can the recessed groove with either side surface arranged orthogonal to the bottom surface. The gas exhaustion assisting structure can be formed at an inner surface of the first separator and/or the second separator. It may have one of the below-described structures, or may be a combination of multiple kinds of structures. Although such a plurality of gas exhaustion assisting structures of multiple kinds are preferably provided in the maximum possible number in view of assisting gas exhaustion, a mode preferable in each application can be used in view of manufacturability and the like. The gas exhaustion assisting structure may include (1) a slope and (2) a gas exhaustion groove described hereinafter as an example.

(1) Slope

Figure 4:
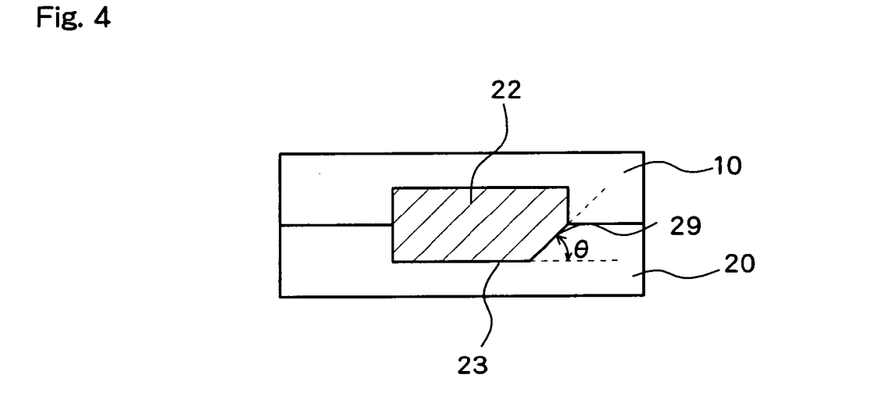
FIG. 4 shows a gas exhaustion assisting structure according to the embodiment of the present invention.
Figure 5:
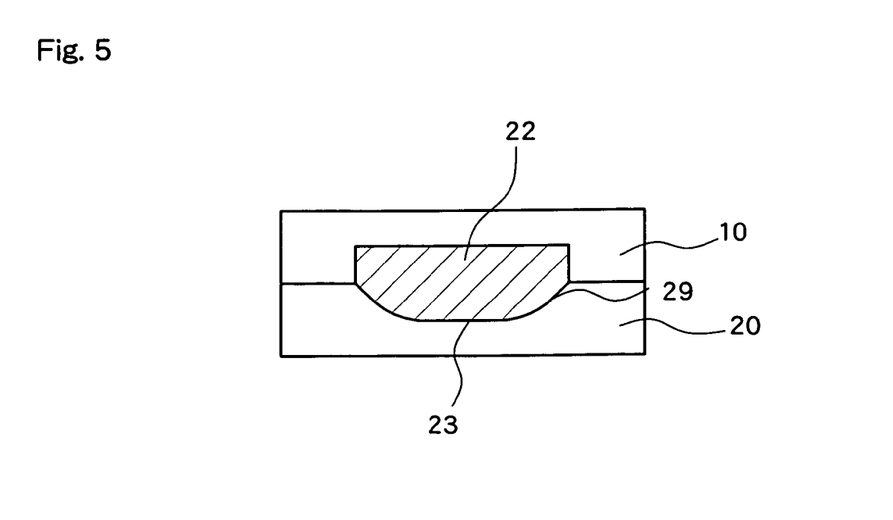
FIG. 5 shows a gas exhaustion assisting structure according to the embodiment of the present invention.
Figure 6:
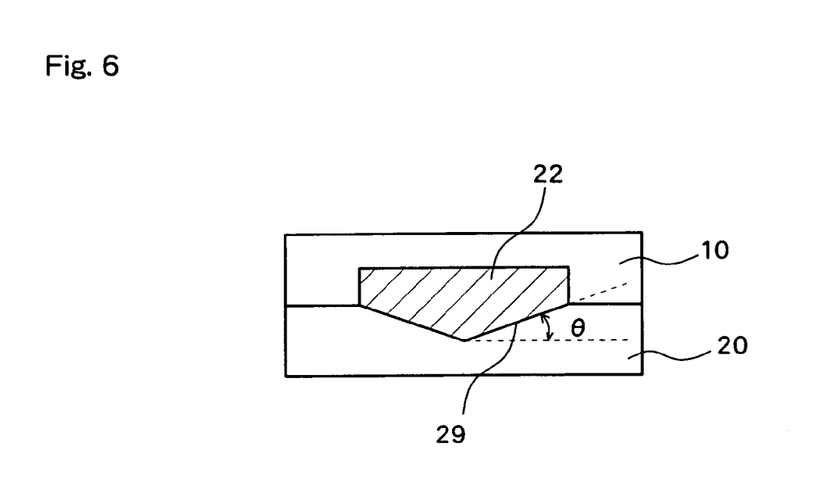
FIG. 6 shows a gas exhaustion assisting structure according to the embodiment of the present invention.
Figure 7:
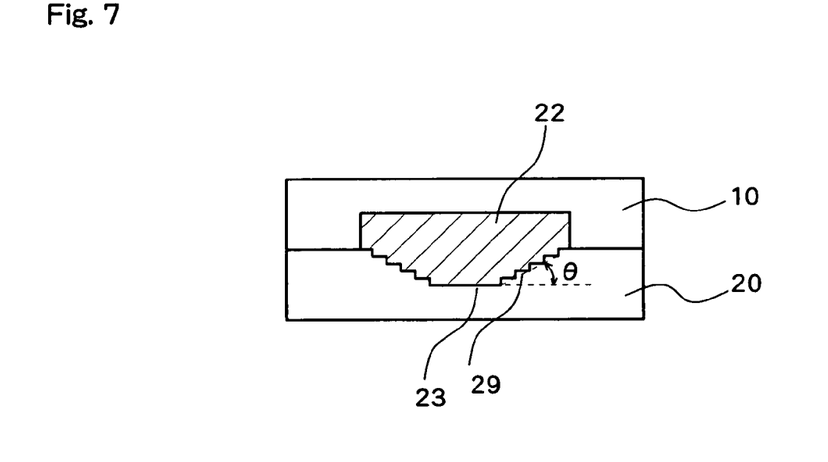
FIG. 7 shows a gas exhaustion assisting structure according to the embodiment of the present invention.
Figure 8:
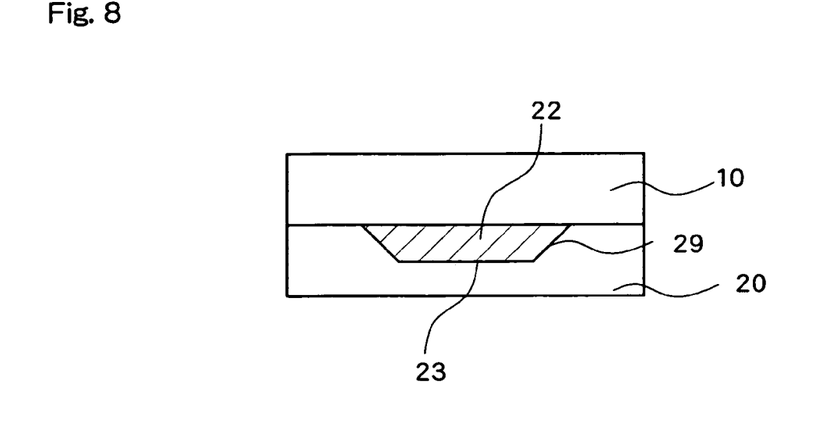
FIG. 8 shows a gas exhaustion assisting structure according to the embodiment of the present invention.

Although in FIG. 3 the angle θ is the same at both side surfaces, the side surfaces may be positioned at different angles θ rather than at the same angle θ. Alternatively, one side surface may be right-angled while the other side surface 29 may be formed as a slope at the angle θ (example: FIG. 4). The slopes may be formed linearly or as curved surfaces (example: FIG. 5). Further, the slope may be formed as a polygonal or stepped shape (such as the shape of a stairway having a uniform step width) (example: FIG. 7). Alternatively, it may be the case that the bottom surface is not provided, and the slope is formed in a V-shape (example: FIG. 6). A structure in which only one of the first separator 10 and the second separator 20 has a slope is also possible (example: FIG. 8).

The slope may be of any form, such as a linear, curved, stepped, or polygonal shape, so long as the gas exhaustion assisting function can be provided. The slope need not be a uniform shape of, for example, a linear, curved, stepped, or polygonal shape, and a plurality of shapes can be employed. For example, the slope may be linear from the bottom surface up to a certain height, of a curved surface from that height to another height, and stepped from that height to a surface where the separators are joined. That is, any shape is possible, so long as the slope is formed as part of the peripheral edge of the recessed groove.

It should be noted that the expression "a sloped configuration" in this specification refers to a broad concept including linear, curved surface, stepped, polygonal configurations, and the like, and is not limited to a linear slope and the like.

The angle θ is preferably 30 degrees to 60 degrees, and particularly preferably 45 degrees. Angles smaller than 30 degrees may lead to insufficient capacity of the recessed groove for holding the adhesive. On the other hand, angles larger than 60 degrees are closer to the right angle, whereby air may fail to be efficiently exhausted.

(2) Gas Exhaustion Groove

Figure 9:
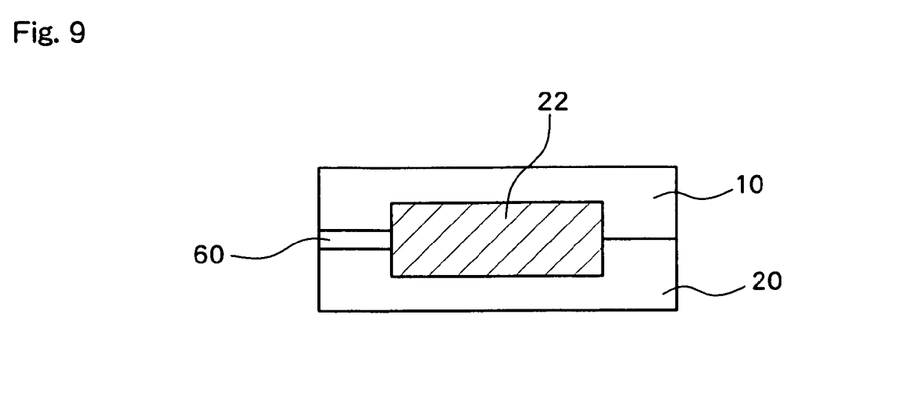
FIG. 9 shows a gas exhaustion assisting structure according to the embodiment of the present invention.

In a configuration shown in FIG. 9, a gas exhaustion groove 60 penetrating to the manifold is provided at a section of the side surface 29 of the recessed groove in the second separator where the separators are joined. Such provision of the gas exhaustion groove 60 leads to exhaustion to the outside of a gas in a gas bubble generated upon bonding. As a result, expansion of air and breakage of the adhesive 22 caused by the gas bubble when the temperature elevates can be suppressed.

The gas exhaustion groove 60 is preferably a groove capable of expelling the gas in the bubble to the outside and preventing the adhesive 22 applied inside from leaking to the outside. If the adhesive 22 is leaked to the outside, the gas channel of the fuel cell may be blocked by the adhesive 22. Therefore, the gas exhaustion groove 60 preferably has a minimized passage diameter. The gas exhaustion groove 60 may have any structure, so long as it can expel the gas, and various kinds of grooves, such as semi-cylindrical, V-shaped, or recessed grooves, may be used.

Figure 10:
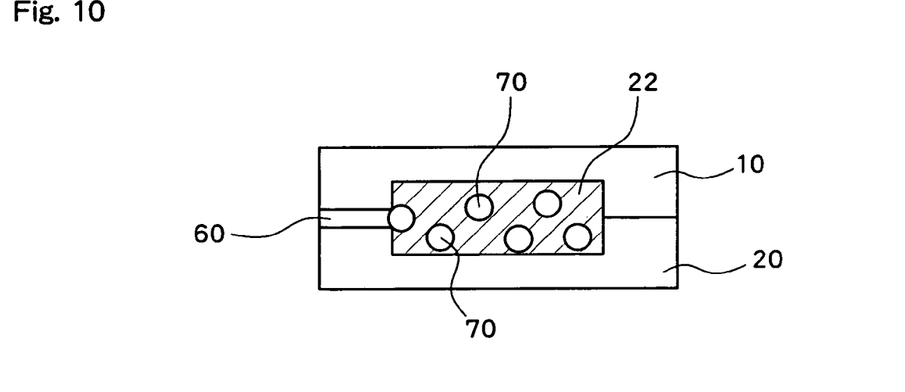
FIG. 10 shows a gas exhaustion assisting structure according to the embodiment of the present invention.

In order to achieve the groove structure capable of expelling the gas in the bubble to the outside and preventing the adhesive 22 inside from leaking to the outside, the adhesive 22 preferable contains a component for suppressing leakage of the adhesive. For example, the adhesive preferably includes spherical beads, and more preferably a plurality of beads 70 in order to better prevent leakage of the adhesive (FIG. 10). The spherical elements, such as beads, may be replaced with other adhesive leakage suppressing components including solid elements of a polygonal shape, such as rectangular parallelepipeds and cubes, formed of various materials inert to the adhesive. Such an adhesive leakage-suppressing component may be placed beforehand in the recessed groove, rather than in the adhesive 22, followed by injection of the adhesive 22 into the adhesive leakage-suppressing component thus disposed.

Given that the minimum depth of the entire gas exhaustion groove 60; i.e. from the inner surface of the recessed groove to the port of the manifold, is denoted as "d" and the diameter of the spherical bead 70 is denoted as "e," when the diameter "e" of the bead is no smaller than the depth "d" of the gas exhaustion groove 60 (depth "d"≦diameter "e"), leakage of the adhesive to the manifold can be suppressed, because the bead 70 can block the gas exhaustion groove 60. The bead is preferably formed of a material inert to the adhesive, such as silica, glass, or resin.

[The Mode of Adhesive Leakage Suppression with Beads]

Figure 11:
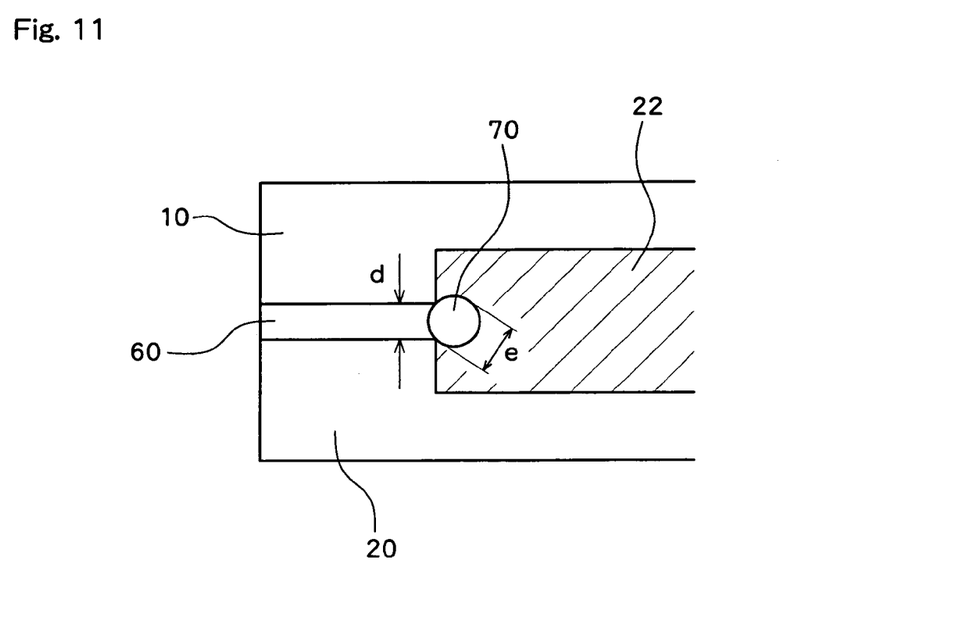
FIG. 11 shows a gas exhaustion assisting structure according to the embodiment of the present invention.

FIG. 10 and FIG. 11 show how adhesive leakage is suppressed with the adhesive containing a plurality of beads 70. The side surface 29 of the second separator 20 is provided with the concave gas exhaustion groove 60 having a recessed shape and the depth "d" fixed throughout the pathway. The adhesive 22 containing a plurality of beads is applied to the recessed groove at the surface of the second separator 20. After such application of the adhesive 22 to the recessed groove, the first separator 10 is bonded to the second separator 20 to compress the adhesive. The beads 70 in the adhesive 22 are brought to the inlet of the gas exhaustion groove 60. Because the diameter "e" of the bead is larger than the depth "d" of the recessed gas exhaustion groove 60, the bead blocks the recessed gas exhaustion groove 60. Such blockage can be achieved not only by the bead with the diameter "e" exceeding the depth "d" of the recessed gas exhaustion groove 60, but also by the bead sized equal to or slightly smaller than the depth. Beads of any size can be used, so long as they can function as resistance to passage of the adhesive so as to prevent outflow of the adhesive.

As described above, the bead 70 blocks the recessed gas exhaustion groove 60, thereby suppressing leakage of the adhesive 22 to the outside. Meanwhile, a gap created between the bead 70 and the gas exhaustion groove 60 allows gas in the gas bubble to be discharged therethrough. The leakage suppression mode of suppressing leakage of the adhesive 22 to the outside while causing discharge of the gas can thus be provided.

[Other Configuration Examples]

Figure 17:
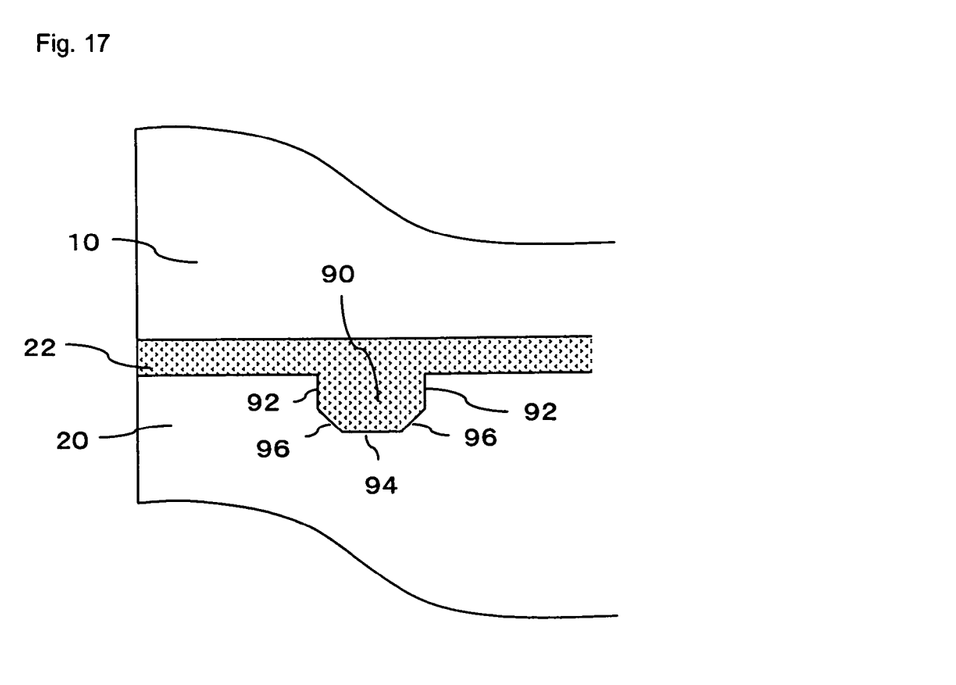
FIG. 17 is a view showing a structure for preventing generation of a gas bubble according to another embodiment of the present invention.

Another configuration example is shown in FIG. 17. FIG. 17 shows the section where the first separator 10 and the second separator 20 are joined, and the adhesive 22 is located between the two separators 10 and 20. In this example, a recessed groove 90 is disposed in the joined surface of the second separator 20, and a side surface 92 and a bottom surface 94 of the recessed groove 90 are positioned substantially orthogonal to each other, but a slope 96 is provided in the connecting section. As a result, whereas the connection angle would be 90 degrees if the side surface 92 and the bottom surface 94 directly contact each other, provision of such a slope 96 results in an angle of 135 degrees at the connecting sections between the side surface 92 and the slope 96 and between the slope 96 and the bottom surface 94. Thus, the angle formed between connecting surfaces in the recessed groove 90 is obtuse, thereby eliminating a corner forming a gas bubble upon application of the adhesive 22.

Figure 18:
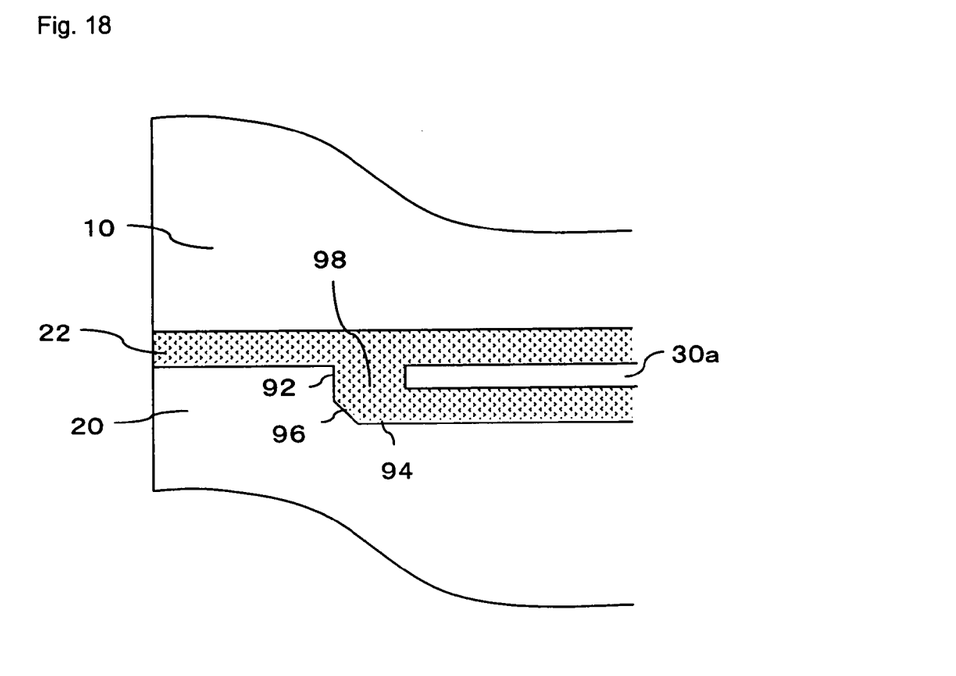
FIG. 18 is a view showing a structure for preventing generation of a gas bubble according to a further embodiment of the present invention.

FIG. 18 shows a junction section where the first separator 10 and the second separator 20 sandwich and fix a electrolyte layer 30a of the MEA 30, and in this section the adhesive 22 is located between the separators 10 and 20, and surrounds an end of the electrolyte layer 30a. At this section, the second separator 20 has a stepped section 98 composed of the side surface 92 and the bottom surface 94 with the distance to the first separator 10 increasing in correspondence to the thickness of the electrolyte layer 30a in the area where the electrolyte layer 30a is provided in order to properly house the electrolyte layer 30a. Similar to the above-described configuration, the slope 96 is provided at the connecting section of the side surface 92 and the bottom surface 94. Consequently, the connecting section between the side surface 92 and the slope 96 is angled at 135 degrees.

Figure 19:
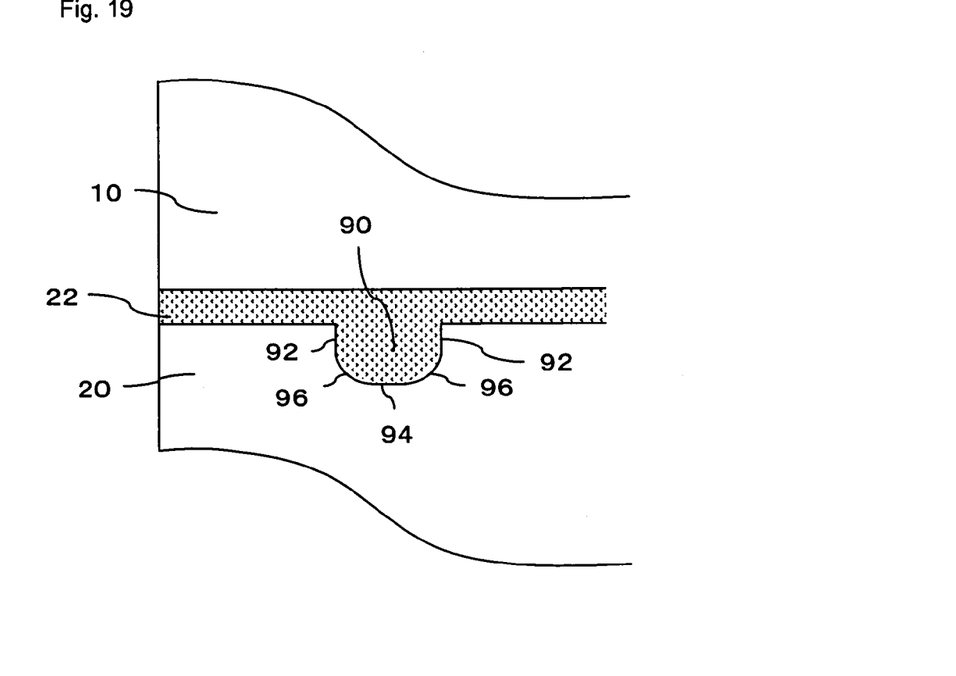
FIG. 19 is a view showing a structure for preventing generation of a gas bubble according to a further embodiment of the present invention.

FIG. 19 shows a further configuration example in which the slope 96 shown in FIG. 17 is formed as a curved surface. More specifically, the slope 96 has an arc-shaped cross section having a predetermined radius smoothly connecting the side surface 92 and the bottom surface 94. Such a configuration eliminates a corner, thereby preventing generation of a gas bubble.

Figure 20:
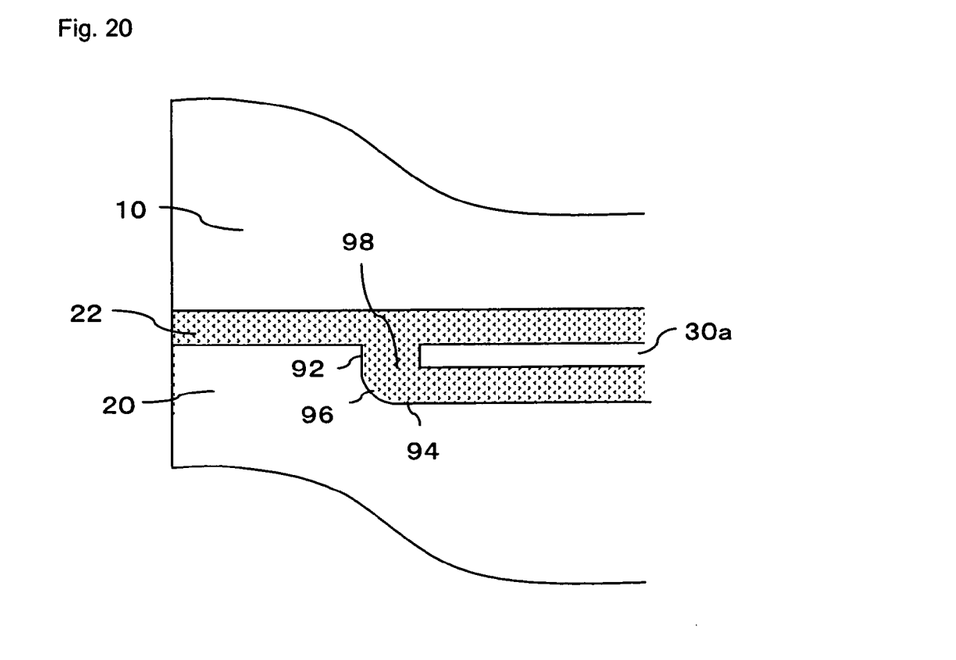
FIG. 20 is a view showing a structure for preventing generation of a gas bubble according to a further embodiment of the present invention.

FIG. 20 shows a further configuration example in which the slope 96 of FIG. 18 is formed as a curved surface.

Figure 21:
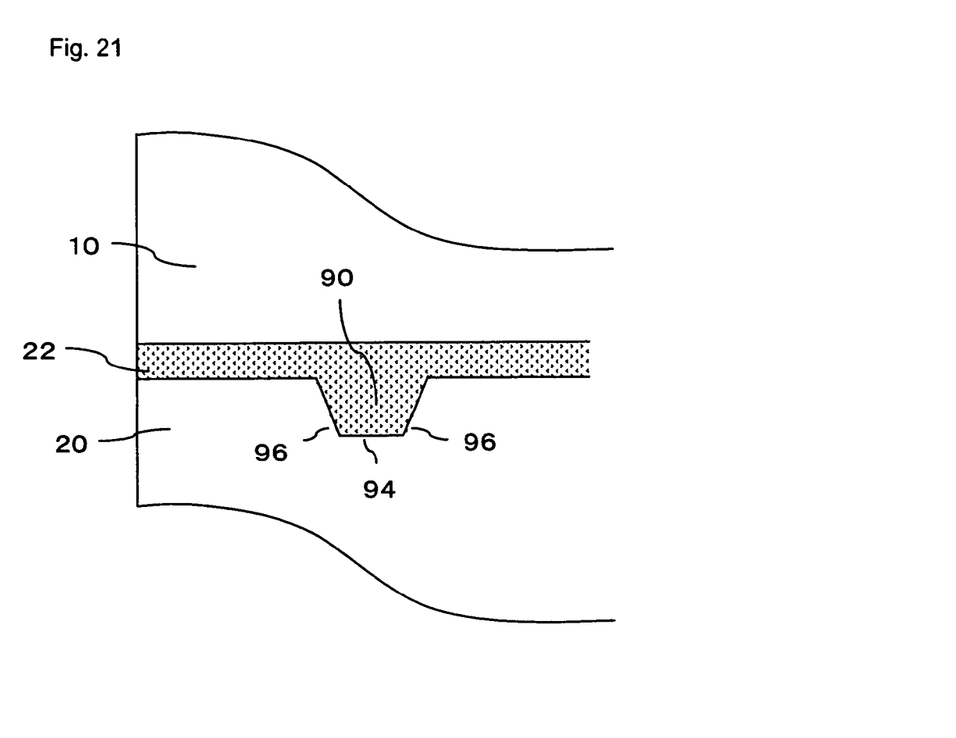
FIG. 21 is a view showing a structure for preventing generation of a gas bubble according to a further embodiment of the present invention.

FIG. 21 shows a further configuration example in which the side surface 92 of FIG. 17 is eliminated and replaced with the slope 96. In other words, the slope 96 functions as the side surface. Such a configuration also eliminates a corner, thereby preventing generation of a gas bubble.

Figure 22:
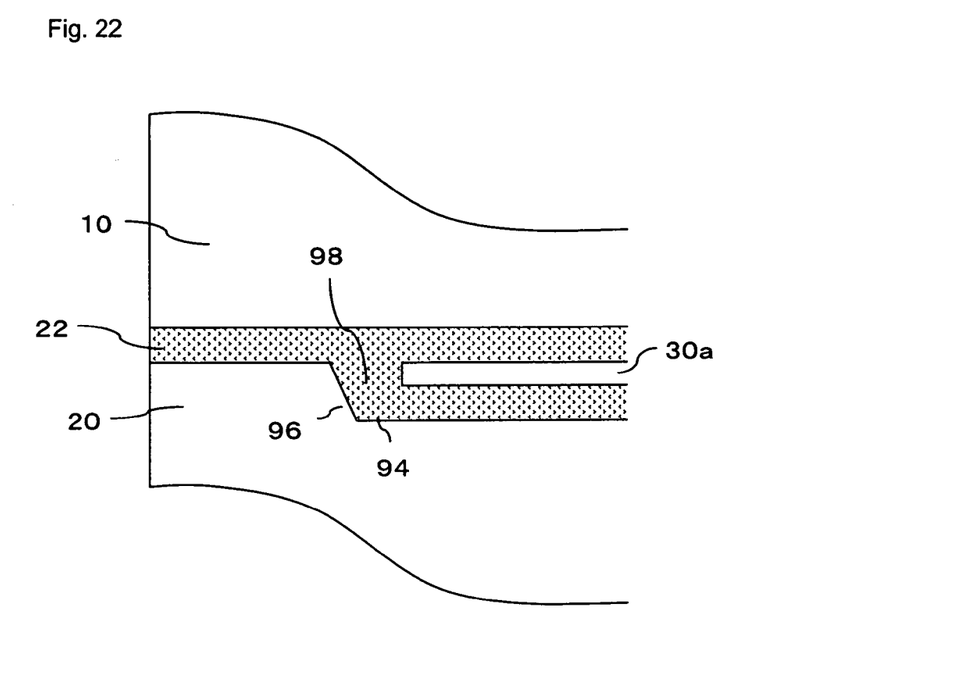
FIG. 22 is a view showing a structure for preventing generation of a gas bubble according to a further embodiment of the present invention.

FIG. 22 shows a further configuration example in which the slope 92 of FIG. 18 is eliminated and the side surface is formed by the slope 96.

Figure 23:
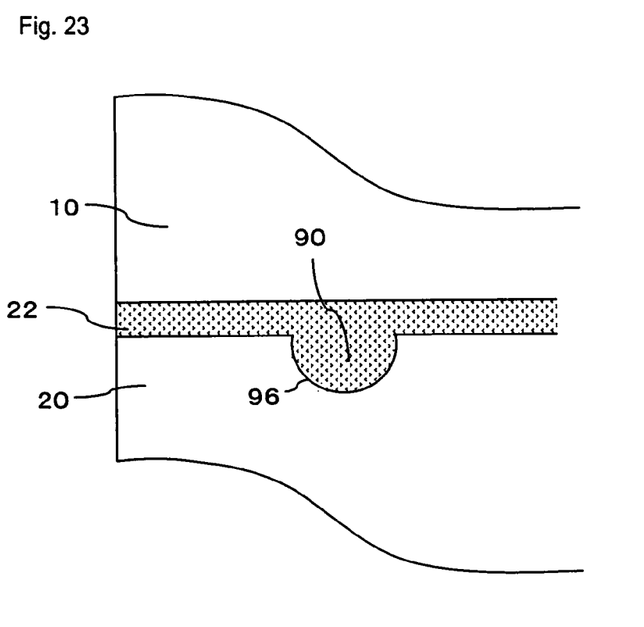
FIG. 23 is a view showing a structure for preventing generation of a gas bubble according to a further embodiment of the present invention.

FIG. 23 shows a further configuration example in which the slope 96 of FIG. 21 is formed as a curved surface. Although the bottom surface 94 is also eliminated in FIG. 23, the bottom surface 94 may be provided.

Figure 24:
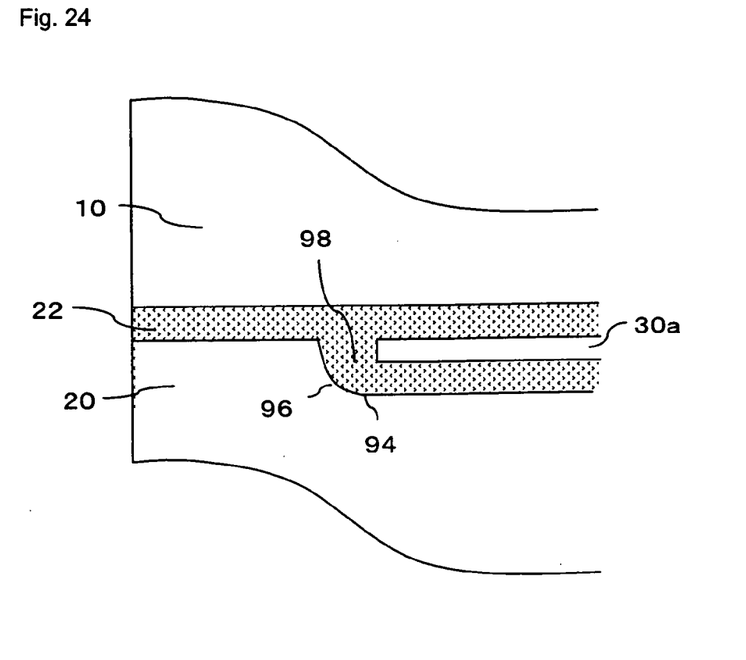
FIG. 24 is a view showing a structure for preventing generation of a gas bubble according to a further embodiment of the present invention.

FIG. 24 shows a further configuration example in which the slope 96 of FIG. 22 is formed as a curved surface.

As described above, a slope is disposed at the connecting section between the side surface and the bottom surface of the recessed groove 90 and the stepped section 98 also in the connecting section between the first separator 10 and the second separator 20 on the side where the separators sandwich the MEA 30.

Generation of a gas bubble may cause expansion of the gas in the gas bubble during a heating process for adhesion, and form a gas leakage path. The present embodiments can effectively prevent generation of such a leakage path. More specifically, it is possible to prevent formation of a leakage path between the inner space of the cell and the manifold functioning as a passage for the refrigerant and other gas pathways.

Although the recessed groove is illustrated and described in connection with the present embodiments, the groove may be replaced with a plurality of recessed holes. The phrase "recessed pit" refers to both a "recessed groove" and a "recessed hole."

INDUSTRIAL APPLICABILITY

The invention is applicable to general fuel cell modules of the solid polymer type, the phosphoric acid type, the molten carbonate type, the solid oxide type, and the like.

The invention claimed is:

1. A fuel cell module formed by stacking a plurality of fuel cells, comprising:
   a separator component separating the plurality of fuel cells;
   an adjacent component disposed adjacent to the separator component in a direction in which the fuel cells are stacked, and affixed to the separator component with an adhesive; and
   a recessed pit for holding the adhesive provided in at least one of the separator component and the adjacent component in a section where the separator component and the adjacent component are bonded to each other, wherein
   the recessed pit comprises a bottom surface and, in at least part of a peripheral edge of the recessed pit,
   a gas exhaustion assisting structure formed either as an exhaustion groove or as a side surface comprising a slope at the peripheral edge for assisting discharge of a gas present between the adhesive and the bottom surface of the recessed pit to the outside when the separator component and the adjacent component are bonded to each other, and the recessed pit is filled with the adhesive, the adhesive directly contacting the slope of the recessed pit.

2. A fuel cell module according to claim 1, wherein the recessed pit is tapered in the fuel cell module.

3. A fuel cell module according to claim 1, wherein the slope is provided at an angle of 120°-150° relative to the bottom surface on a side where the adhesive is held.

4. A fuel cell module according to claim 1, wherein:
   the gas exhaustion groove is disposed on the side surface of the recessed pit for discharging the gas to the outside.

5. A fuel cell module according to claim 4, wherein the adhesive contains an adhesive leakage suppression component for suppressing leakage of the adhesive to the outside.

6. A fuel cell module according to claim 5, wherein the adhesive leakage suppression component is a spherical bead, and a diameter of the bead is larger than a passage diameter of the gas exhaustion groove.

7. A fuel cell module according to claim 1, wherein
the adjacent component disposed adjacent to the separator component in the direction in which the cells are stacked is a metal separator.

8. A fuel cell module according to claim 1, wherein
the recessed pit is provided in both of the separator component and the adjacent component, and the gas exhaustion assisting structure is provided in each of the recessed pits.

9. A fuel cell module formed by stacking a plurality of fuel cells, comprising:
a separator component separating the plurality of fuel cells;
an adjacent component disposed adjacent to the separator component in a direction in which the fuel cells are stacked, and affixed to the separator component with an adhesive; and
a stepped section for housing a catalyst layer for holding the adhesive provided in at least one of the separator component and the adjacent component in a section where the separator component and the adjacent component are bonded to each other, wherein
a gas exhaustion assisting structure formed either as an exhaustion groove or as a side surface comprising an outer peripheral slope of the stepped section for assisting discharge of a gas present between the adhesive and a bottom surface of the stepped section to the outside when the separator component and the adjacent component are bonded to each other is provided at the stepped section, and
the stepped section is filled with the adhesive, the adhesive directly contacting the slope of the stepped section.

10. A fuel cell module according to claim 9, wherein
the slope is provided at a junction section between the bottom surface and a side surface of the stepped section for connecting the bottom surface and the side surface.

11. A fuel cell module according to claim 10, wherein
the stepped section is a recessed pit.

12. A fuel cell module according to claim 9, wherein
the adjacent component disposed adjacent to the separator component in the direction in which the cells are stacked is a metal separator.

13. A fuel cell module according to claim 9, wherein
the stepped section is provided in both of the separator component and the adjacent component, and the gas exhaustion assisting structure is provided in each of the stepped sections.

14. The fuel cell module according to claim 13, wherein the stepped section is a recessed pit.

* * * * *